United States Patent [19]
Baurand et al.

[11] Patent Number: 5,546,262
[45] Date of Patent: Aug. 13, 1996

[54] ELECTRONIC PROTECTION DEVICE

[75] Inventors: Gilles Baurand, Montesson la Borde; Antoine Stentz, Rueil Malmaison, both of France

[73] Assignee: Schneider Electric SA, Boulogne-Billancourt, France

[21] Appl. No.: 297,860

[22] Filed: Aug. 30, 1994

[30] Foreign Application Priority Data

Sep. 1, 1993 [FR] France .................................. 93 10490

[51] Int. Cl.⁶ .................................................. H02H 5/04
[52] U.S. Cl. .............................. 361/31; 361/106; 318/471; 318/783
[58] Field of Search ............................ 361/23–31, 103, 361/106, 93–97; 318/471, 783

[56] References Cited

U.S. PATENT DOCUMENTS 4,547,826  10/1985  Premerlani .............................. 361/25

4,866,559   9/1989  Cobb, III et al. ....................... 361/103

FOREIGN PATENT DOCUMENTS

| 0352987 | 1/1990  | European Pat. Off. |
| 2309063 | 11/1976 | Germany. |
| 2618061 | 11/1977 | Germany. |
| 3902416 | 8/1990  | Germany. |

*Primary Examiner*—Jeffrey A. Gaffin
*Assistant Examiner*—Michael J. Sherry
*Attorney, Agent, or Firm*—Oblon, Spivak, McClelland, Maier & Neustadt, P.C.

[57]  ABSTRACT

An electronic protection device for providing thermal protection of a load by cutting off the multiphase supply of power to the load includes a thermal sensor having at least one resistive element thermally coupled to a temperature sensor connected to an electronic processor circuit. This circuit generates a command instruction in response to any overload detected by the temperature sensor. Each resistive element of the thermal sensor is fed with current by a current sensor on a phase wire supplying power to the load.

6 Claims, 2 Drawing Sheets

ELECTRONIC PROTECTION DEVICE

BACKGROUND OF THE INVENTION

1. Field of the Invention

The present invention concerns an electronic protection device for thermal protection of a load such as a rotating electrical machine or a distribution circuit by cutting off the multiphase supply of power to the load in the event of an imbalance between phase currents or a current overload on at least one phase, the in device finding a specific application thermal protection relays and circuit-breakers.

2. Description of the Prior Art

Existing thermal protection relays protect rotating electrical machines or distribution circuits from overloads by monitoring the current absorbed on each phase or detecting phase imbalance or absence of a phase. A thermal protection relay includes a bimetal strip for each phase which is heated by the phase current. If an overload occurs on any phase the bimetal strip of the overloaded phase bends and mechanically operates a tripping mechanism which opens contacts to cut off the supply of power to the rotating electrical machine or the distribution circuit. Tripping in response to a phase imbalance or absence of a phase is effected by a differential device.

These thermal protection relays are difficult to use if the current is greater than around 100 amperes. Heating of the bimetal strip and therefore the tripping current are difficult to control because of spurious heating effects.

Motors are usually protected by electronic protection relays such as those described in French patent 2 586 489. These relays include a current sensor for each phase producing an image of the phase current. An electronic processor circuit receives and processes the phase current images in order to output a tripping instruction if necessary.

An electronic protection relay described in French patent 2 641 410 is provided with a thermal sensor in the form of resistive heating elements through which the phase currents flow and which are thermally coupled to a temperature sensor by means of a thermal coupling body. The thermal sensor provides a simple way of memorizing the thermal state of the load protected by the relay.

An object of the invention is to provide an electronic protection device which is capable of detecting current overloads and/or phase current imbalance at high currents and using a thermal sensor employing silkscreen-printed resistive elements. This device is insensitive to harmonics of the currents.

SUMMARY OF THE INVENTION

The invention consists in an electronic protection device for providing thermal protection of a load by cutting off the multiphase supply of power to said load, said device comprising a thermal sensor having at least one resistive element thermally coupled to a temperature sensor connected to an electronic processor circuit adapted to supply a command instruction in response to overloads detected by said temperature sensor, in which device each resistive element of said thermal sensor is fed with current by a current sensor on a phase wire supplying power to said load.

In accordance with one feature of the invention the resistive elements of the thermal sensor are fed with rectified current from secondary outputs of rectifiers associated with the current sensor and signals representative of the voltages across each resistive element are sent to the electronic processor circuit.

In accordance with one feature of the invention the electronic processor circuit is microprocessor-based and the signals representative of the voltages are sent to an analog-to-digital converter associated with said circuit.

In accordance with one feature of the invention the various resistive elements are thermally coupled to one and the same temperature sensor by a thermal coupling plate made from a heat-resistant electrically insulative material.

In accordance with one feature of the invention the electronic processor circuit controls an actuator which operates a mechanism which operates power contacts on the phase wires.

The invention is now described in more detail with reference to embodiments thereof given by way of example and shown in the appended drawings.

DETAILED DESCRIPTION OF THE PREFERRED EMBODIMENTS

Figure 1:
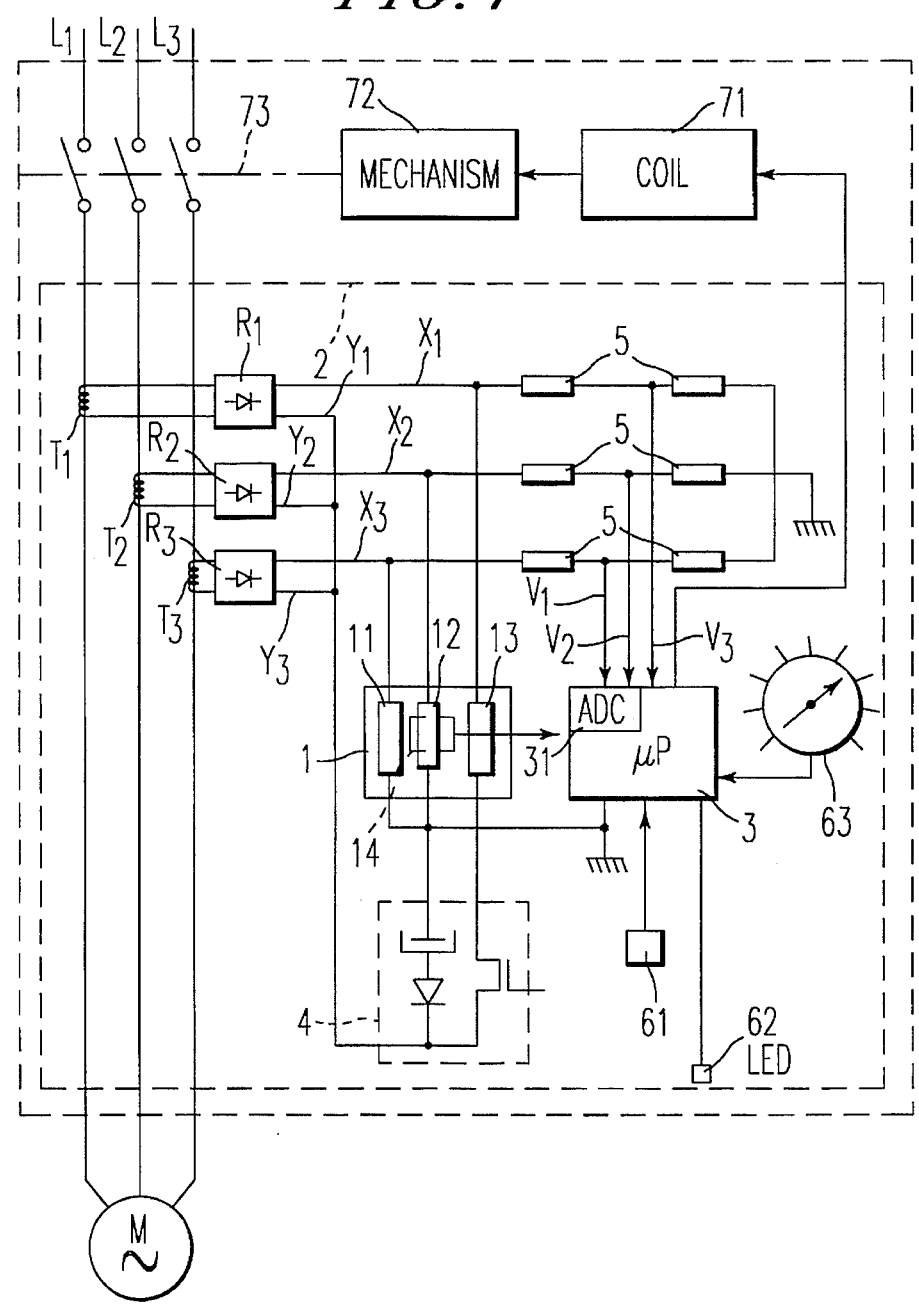
FIG. 1 is a block diagram of a motor circuit-breaker including the detection device of the invention.
Figure 3:
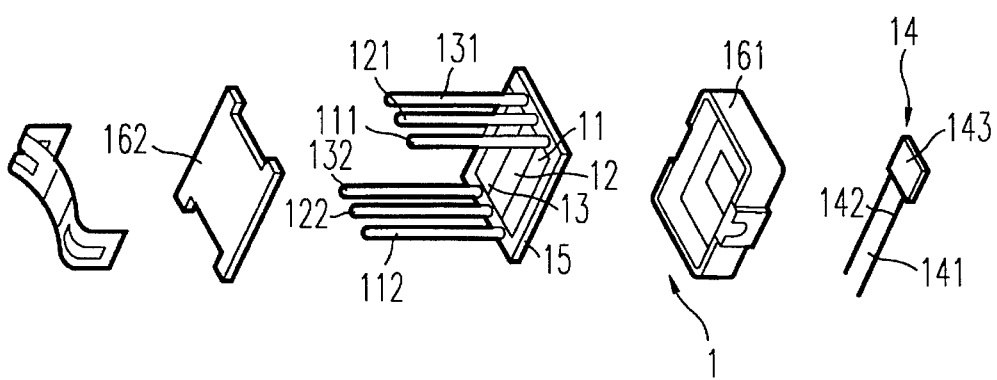
FIG. 3 is an exploded perspective diagrammatic view of the thermal sensor of the protection device included in the devices of FIGS. 1 and 2.

The thermal protection device 2 is adapted to interrupt the current on a line $L_1$, $L_2$, $L_3$ supplying power to a three-phase load (which in this example is a three-phase electric motor M) in the event of a phase current imbalance and/or an overload.

On each phase wire $L_1$, $L_2$, $L_3$ is a respective current sensor $T_1$, $T_2$, $T_3$ in the form of a current transformer. These transformers are known sensors conventionally employed to measure current. The secondary outputs of each transformer $T_1$, $T_2$, $T_3$ are connected to a respective rectifier $R_1$, $R_2$, $R_3$ providing a rectified current on a respective output line $X_1$–$Y_1$, $X_2$–$Y_2$, $X_3$–$Y_3$ connected to a thermal sensor 1 and to an electronic processor circuit 3.

The various rectified output currents of the rectifiers $R_1$, $R_2$, $R_3$ feed resistive heating elements or resistors 11, 12, 13 of the thermal sensor 1. Each resistor 11, 12, 13 is connected to the outputs of a respective rectifier $R_1$, $R_2$, $R_3$ so that the rectified currents supplied thereby flows through it. Each resistor 11, 12, 13 has two connecting pins 111 and 112, 121 and 122, 131 and 132, respectively, which are used to connect it to the associated rectifier. The first pin 111, 121, 131 is connected to a respective output $X_1$, $X_2$, $X_3$ of a rectifier and the second pin 112, 122, 132 is connected to a respective second output $Y_1$, $Y_2$, $Y_3$ of the same rectifier.

The connection pins 112, 122, 132 of the respective resistors 11, 12, 13 are connected in common to the secondary outputs $Y_1$, $Y_2$, $Y_3$ of the rectifiers $R_1$, $R_2$, $R_3$ by a power supply circuit 4 which supplies power to the processor circuit 3.

The various resistors 11, 12, 13 are thermally coupled to one and the same temperature sensor 14. They are separated from the temperature sensor 14 by a thermal coupling plate 15 made from an electrically insulative heat-resistant material. The thermal coupling plate 15 is preferably made from a ceramic material such as alumina.

Each resistor 11, 12, 13 is silkscreen-printed onto the thermal coupling plate 15. The temperature sensor 14 can be silkscreen-printed onto the opposite side of the coupling plate 15 from the resistors 11, 12, 13. The sensor 14 can be independent of the thermal coupling plate 15, in which case it is in direct contact therewith.

The temperature sensor 14 is a known type of thermistor device. It comprises a temperature sensing plate 143 to which are connected connecting pins 141, 142.

The resistors 11, 12, 13, the thermal coupling plate 15 and the temperature sensor 14 are housed in a casing made from an electrically insulative material and in several parts 161, 162.

The output signal from the sensor 14 is sent to the electronic processor circuit 3 which processes the signals received and outputs a tripping or command instruction if necessary. The electronic processor circuit 3 is a digital microprocessor-based circuit.

Values representative of the voltages across the resistors 11, 12, 13 are sent by connections $V_1$, $V_2$, $V_3$ to the analog-to-digital converter 31 of the electronic processor circuit 3 so that the latter can detect phase imbalance or absence of any phase. One end of each resistor 11, 12, 13 is connected via a voltage divider 5 and a connection $V_1$, $V_2$, $V_3$ to the input of an analog-to-digital converter 31 associated with the electronic processor circuit 3. The other end of the resistor is connected to the circuit 4 which supplies power to the electronic processor circuit 3 and is connected to the secondary outputs of the rectifiers $R_1$, $R_2$, $R_3$.

An input of the processor circuit 3 is connected to a unit 63 for varying the motor current. Another input of the processor circuit 3 is connected to a compensator sensor 61 which supplies to the processor circuit a signal representative of the ambient temperature. The operating status of the device is indicated by a light-emitting diode (LED) 62 controlled by the microprocessor-based circuit 3.

Figure 2:
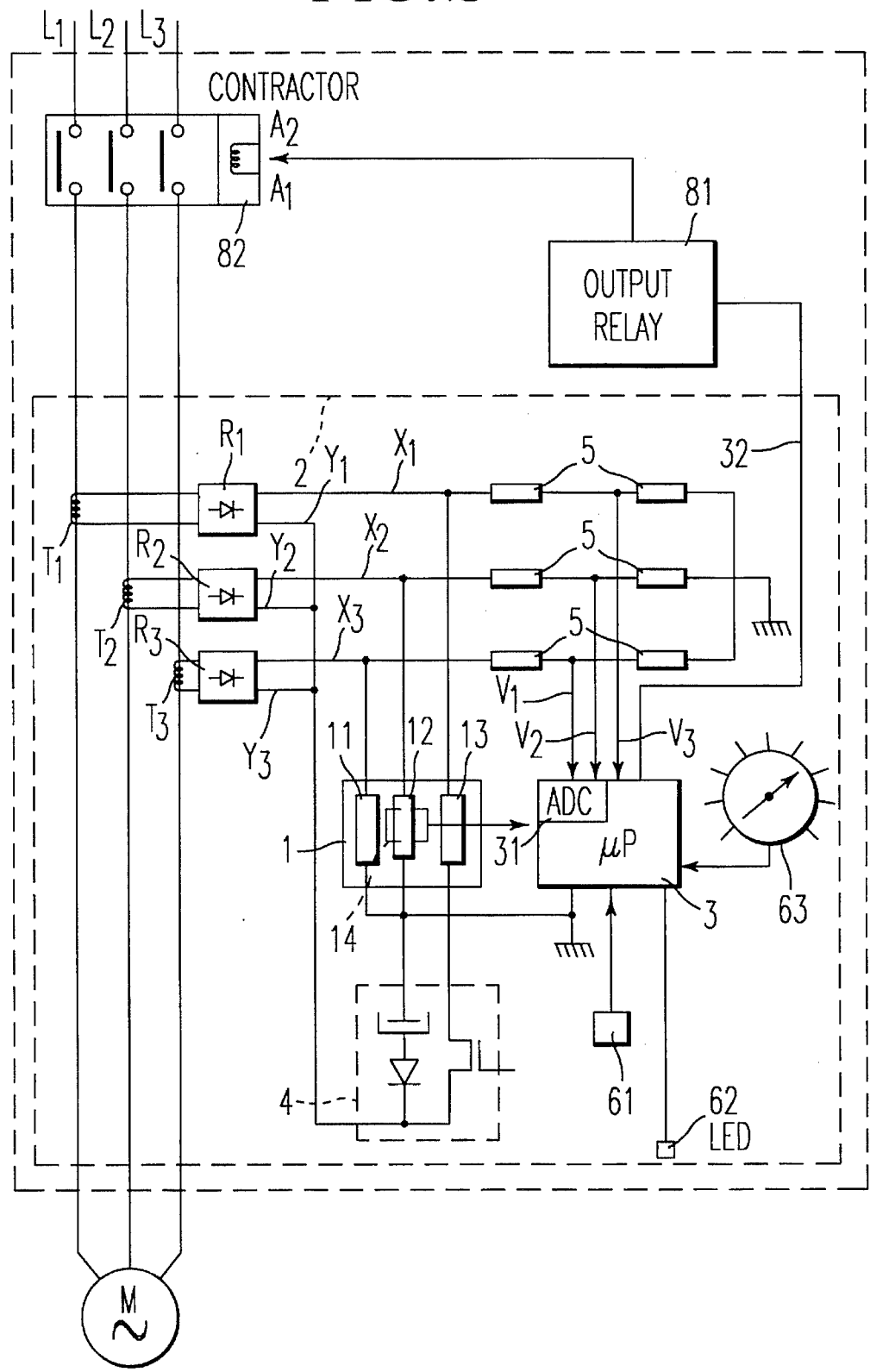
FIG. 2 is a block diagram of a motor thermal protection relay including the protection device of the invention.

The thermal protection device 2 can be mounted in a circuit-breaker such as that shown in FIG. 1 or in a thermal protection relay such as that shown in FIG. 2.

In the FIG. 1 circuit-breaker the microprocessor calculates from the signal supplied by the temperature sensor 14 any phase imbalance or overload and through an actuator 71 in the form of a coil trips the mechanism 72 which operates the contacts cutting off the supply of power to the motor. The mechanism 72 operates the power contacts on the phase wires $L_1$, $L_2$, $L_3$ via a mechanical linkage 73.

In the FIG. 2 thermal protection relay an output 32 of the microprocessor operates an output relay 81 which operates a contactor 82 adapted to cut off the supply of power to the motor.

The operation of the device is described next.

Each resistor 11, 12, 13 of the thermal sensor 1 is connected to the output of a rectifier associated with a current transformer. It therefore carries a rectified current proportional to the current on one phase $L_1$, $L_2$, $L_3$. The temperature of the resistors 11, 12, 13 is measured by the temperature sensor 14 which provides a permanent image of the temperature rise caused by the phase current images.

If the thermal image produced by the thermal sensor 1 exceeds a specific threshold the microprocessor 3 generates a tripping instruction.

The values representative of the voltages across the resistors 11, 12, 13 are applied via the voltage dividers 5 and connections $V_1$, $V_2$, $V_3$ to the inputs of the analog-to-digital converter 31. If the values representative of the voltages measured across the resistors 11, 12, 13 indicate a phase imbalance or absence of any phase, the microprocessor of the circuit 3 generates a tripping instruction.

In the FIG. 1 motor circuit-breaker the tripping instruction supplied by the microprocessor operates the mechanism 72 via the coil 71 to open the power contacts on the line by way of the linkage 73.

In the FIG. 2 thermal protection relay the tripping instruction supplied by the microprocessor operates the contactor 82 via the relay 81.

If the power supply is cut off the thermal sensor 1 retains a thermal image of the temperature of the motor.

It is to be understood that variants and improvements of detail can be envisaged without departing from the scope of the invention, even to the extent of replacing means as described herein with equivalent means.

There is claimed:

1. An electronic protection device for providing thermal protection of a load by cutting off a multiphase supply of power to said load, said device comprising:

a plurality of current sensors each formed on respective phase wires which supply power to said load;

a thermal sensor having at least one resistive element silkscreen-printed onto a thermal coupling plate formed of an electrically insulative heat-resistant material to which a temperature sensor is thermally coupled, each resistive element receiving a current from at least one of said current sensors which represents a current on a respective phase wire, and said temperature sensor measures temperatures of each resistive element;

an electronic processor circuit which is connected to said temperature sensor and receives, from said current sensors, signals representative of voltages and generates a tripping instruction when the signal from said temperature sensor exceeds a threshold or when the voltages indicate a phase imbalance or absence of any phase.

2. A device according to claim 1, wherein said electronic processor circuit control; an actuator which operates a mechanism operating power contacts on the phase wires.

3. The device according to claim 1, further comprising:

a plurality of rectifiers corresponding to said plurality of current sensors, wherein said resistive elements of said thermal sensor are fed with rectified currents from secondary outputs of said rectifiers, and signals representative of the voltage across each resistive element are fed to said electronic processor circuit.

4. A device according to claim 3, wherein each resistive element is connected to a circuit which supplies power to said electronic processor circuit and to a corresponding one of said rectifiers.

5. A device according to claim 3, wherein said electronic processor circuit is microprocessor-based and comprises an analog-to-digital converter, and said signals representative of said voltages are sent to said analog-to-digital converter.

6. A device according to claim 3, wherein each resistive element is connected via a voltage divider to the analog-to-digital converter.

* * * * *